United States Patent [19]

Shigehara

[11] Patent Number: 4,853,886
[45] Date of Patent: Aug. 1, 1989

[54] DIGITAL SIGNAL PROCESSING CIRCUIT
[75] Inventor: Hiroshi Shigehara, Yokohama, Japan
[73] Assignee: Kabushiki Kaisha Toshiba, Kawasaki, Japan
[21] Appl. No.: 16,125
[22] Filed: Feb. 18, 1987
[30] Foreign Application Priority Data Feb. 21, 1986 [JP] Japan .................................. 61-36664

[51] Int. Cl.$^4$ ............................................... G06F 7/38
[52] U.S. Cl. .................................... 364/745; 364/736
[58] Field of Search ................ 364/745, 737, 754–760, 364/736

[56] References Cited

U.S. PATENT DOCUMENTS

| 3,019,977 | 2/1962 | Duinker et al. | 364/736 |
| 4,589,084 | 5/1986 | Fling et al. | 364/745 |
| 4,594,678 | 6/1986 | Uhlenhoft | 364/736 |
| 4,598,382 | 7/1986 | Sato | 364/745 |

OTHER PUBLICATIONS

Kriz, "Multiply Round Control", *IBM Technical Disclosure Bulletin*, vol. 27, #6, pp. 3404–3405, Nov. 1984.
"Study on Generation of Musical Tone in PARCOR Speech Synthesis," Transactions of the Committee on Speech Research, The Acoustical Society of Japan S 82–04, Apr. 26, 1982.

Primary Examiner—Gary V. Harkcom
Assistant Examiner—Dale M. Shaw
Attorney, Agent, or Firm—Finnegan, Henderson Farabow, Garrett, & Dunner

[57] ABSTRACT

A multiplier multiplies first binary data X and second binary data Y in 2' complement format, X=(X4, X3, X2, X1) and Y=(Y4, Y3, Y2, Y1) to obtain the product Q=(Q4, Q3, Q2, Q1). An adder/subtractor performs addition/subtraction of third binary data Q'=(Q4, Q3, $\overline{Q4}$, $\overline{Q4}$) and fourth binary data Z=(Z4, Z3, Z2, Z1) in 2's complement format in response to a control signal. The third binary data includes upper bits and lower bits. The upper bits includes the upper two bits Q4 and Q3 of the multiplication result Q=(Q4, Q3, Q2, Q1). The lower two bits include the inverted most significant bit $\overline{Q4}$ of the multiplication result. When the adder/subtractor operates in the adder mode, the inverted most significant bit $\overline{Q4}$ of the multiplication result is applied as a carry input to the adder/subtractor. In the subtractor mode, the most significant bit Q4 of the multiplication result is applied as a carry bit to the adder/subtractor.

4 Claims, 3 Drawing Sheets

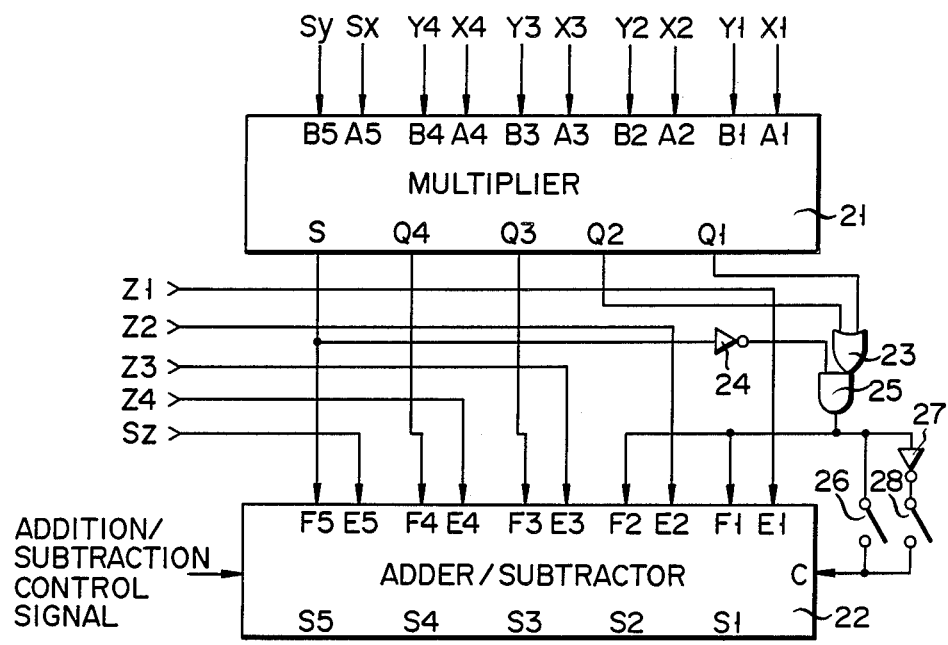
F I G. 4
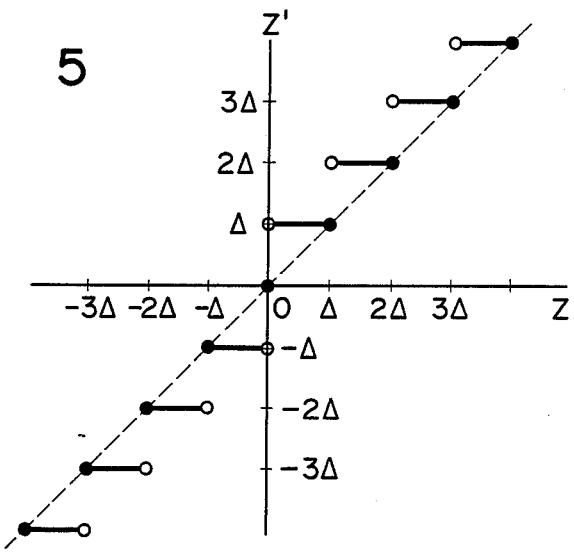
F I G. 5

DIGITAL SIGNAL PROCESSING CIRCUIT

BACKGROUND OF THE INVENTION

This invention relates to a digital signal processing circuit used in voice synthesis, musical synthesis, and the like, and more particularly, to a digital processing circuit with a rounding function for the results of a multiplication function.

The omission of several lower bits has been employed for rounding the results of a multiplication function. The rounding attenuates the true value. Because of this fact, when one attempts to generate an attenuated sine-wave of a desired frequency utilizing the impulse response characteristic of a lattice filter, it is impractical to use the sine-wave as the scale signal in a musical tone because the attenuation time constant of the sine-wave is too great. Recently, in musical tone synthesis using the lattice filter, the raising of several lower bits to a unit has been proposed for rounding the results of multiplication. The technology concerning raising lower bits to a unit is described in a paper by Hibino et al, entitled "Generation of Musical Tones in PARCOR Speech Synthesis LSI" in Transactions of the Committee on Speech Research, The Acoustical Society of Japan, S82-04 (Apr. 26, 1982), pp 25-32. It is noted, however, that the raising to a unit described in the above article involves the following problems. To discuss the problems, it is assumed that the result of multiplication of M-bit data is Z, and the value of the M-bit data after the N lower bits of the M-bit data have been raised to a unit is Z'. It is further assumed that both Z and Z' are expressed in 2's complement format. The article describes that if Z is positive or zero, all of the N lower bits are made binary "1"s, and if Z is negative, all of these bits are made binary "0"s. If $|Z| \leq 1$, a relationship between Z and Z' can be plotted, as shown in FIG. 1, in which the X-axis represents Z and the Y-axis represents Z'. In FIG. 1, a broken line depicts the Z—Z' relationship when the raising to a unit is not performed. A solid line indicates the relationship when the raising to a unit is performed. As seen in FIG. 1 in the latter case, Z' changes stepwise with respect to Z.

Let us consider the mean value, i.e., the DC component of the signal, after having been raised to a unit, when a signal with no DC component is input to the circuit with the input-output characteristic of FIG. 1. Table 1 shows the relationship between levels of the signal after having been raised to a unit and probabilities of these level occurrences. In Table 1, $\Delta = 2^{-(M-N-1)}$ and $Q = 2^{-N}$. The DC component of the signal after having been raised to a unit, which is the sum of the products of the respective signal levels and the corresponding probabilities in Table 1, is expressed by $-\Delta/2^{N+1}$. This indicates that the signal after having been raised to a unit includes the negative DC component.

TABLE 1

| Signal level after raising to a unit | Occurrence probability |
|---|---|
| $(2^{M-N-1}-Q) \cdot \Delta$ | $2^{N-M}$ |
| $(2-Q) \cdot \Delta$ | $2^{N-M}$ |
| $(1-Q) \cdot \Delta$ | $2^{N-M}$ |
| 0 | 0 |
| $-\Delta$ | $2^{N-M}$ |
| $-2 \cdot \Delta$ | $2^{N-M}$ |

TABLE 1-continued

| Signal level after raising to a unit | Occurrence probability |
|---|---|
| $-2^{M-N-1} \cdot \Delta$ | $2^{N-M}$ |

DC component: $-\Delta/2^{N+1}$

Therefore, when the rounding process in which the multiplication result is raised to a unit is applied to voice synthesis, musical tone synthesis, etc., in which digital filters, lattice filters 2'having many multiplying circuits are used, a considerable amount of DC component will occur. This degrades the S/N performance of the device involved.

SUMMARY OF THE INVENTION

Accordingly, an object of this invention is to provide a digital signal processing circuit in which the DC component occurring when the raising to a unit is carried out is reduced.

According to one aspect of the present invention, there is provided a digital signal processing circuit comprising:

a multiplier for multiplying first and second binary data in 2's complement format and omitting a predetermined number of lower bits of the actual multiplication result of multiplication to obtain a virtual multiplication result;

an adder/subtractor for performing addition/subtraction of third binary data and fourth binary data in 2's complement format in response to a control signal, the higher bits of said third binary data being said multiplication result and the lower bits of said third binary data being an inverted highest bit of said virtual multiplication result of multiplication; and means for supplying to said adder/subtractor the inverted highest bit of said virtual multiplication result as the lowest bit of the data when said adder/subtractor operates in the adder mode in response to said control signal, and for supplying to said adder/subtractor said highest bit of said virtual multiplication result as the lowest bit of the data when said adder/subtractor operates in the subtractor mode.

According to another aspect of the present invention, there is provided a digital signal processing circuit comprising:

a multiplier for multiplying first and second binary data in 2's complement format;

an adder/subtractor for performing addition/subtraction of third binary data and fourth binary data in 2's complement format in response to a control signal, the higher bit of said third binary data being a predetermined number of higher bits of a multiplication result and the lower data of said third binary data being the logical product of the logical sum of the lower bits of said multiplication result except said predetermined number of said higher bits and an inverted highest bit of said multiplication result; and means for supplying to said adder/subtractor said logical product as the lowest bit of the data when said adder/subtractor operates in the adder mode in response to said control signal, and for supplying to said adder/subtractor an inverted logical product as the lowest bit of the data when said adder/subtractor operates in the subtractor mode.

BRIEF DESCRIPTION OF THE DRAWINGS

FIG. 4 is a circuit diagram of a digital signal processing circuit according to a second embodiment of the present invention; and FIG. 5 graphically shows relationships between the signal Z (before raising to a unit) and Z' (after raising to a unit), obtained when the signal processing circuit shown in FIG. 4 is used.

DETAILED DESCRIPTION OF THE PREFERRED EMBODIMENTS

A digital signal processing circuit according to a first embodiment of the present invention will now be described. 4-bit data $X=(X4, X3, X2, X1)$ is multiplied by 4-bit data $Y=(Y4, Y3, Y2, Y1)$. The 4-bit data X and Y are expressed in 2's complement format. In the expressions of the 4-bit data, the highest or most significant bit (MSB) is the bit with the suffix of the highest number, and the lowest or least significant bit (LSB) is the bit with the suffix of the lowest number.

The higher or upper 2 bits of the 4-bit data $Q=(Q4, Q3, Q2, Q1)$ of the actual result of multiplication of data X and Y are used as the virtual multiplication result. The two lower bits Q2 and Q1 of the data $Q=(Q4, Q3, Q2, Q1)$ are raised to a unit. After having been raised to a unit the data Q is differently expressed as follows, according to whether the data Q is negative or positive.

$$Q'=(0, Q3+1, 0, 0): Q \geq 0 \ (Q4=0) \quad (1)$$

$$Q'=(1, Q3, 0, 0): Q<0 \ (Q4=1) \quad (2)$$

The after-raising data Q' and original data Z are subjected to an addition or subtraction function to provide $Z+Q'$ or $Z-Q'$. The multiplication of the 4-bit data X and Y, the addition $Z+Q'$ and the subtraction $Z-Q'$ may be performed by the circuit shown in FIG. 2.

Figure 1:
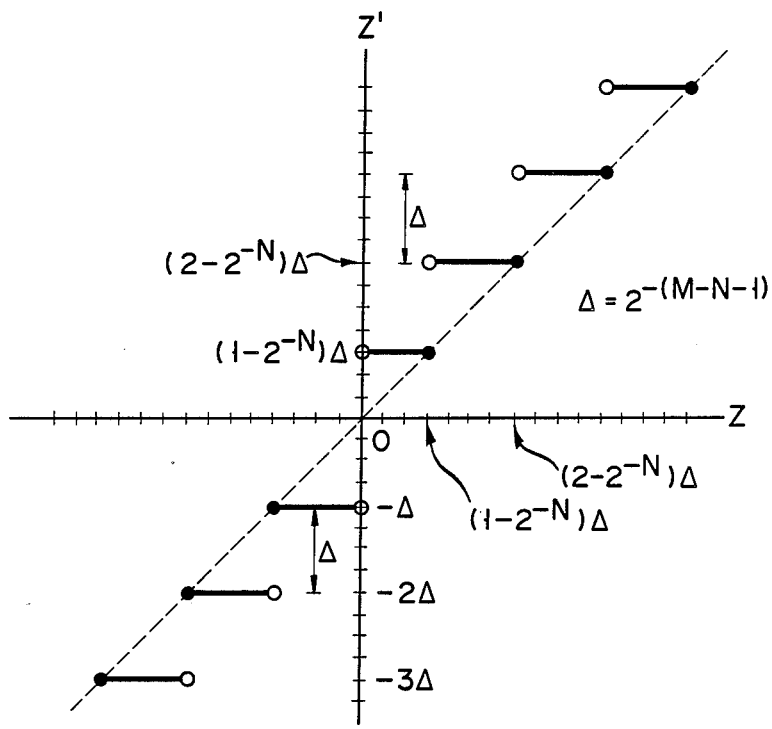
FIG. 1 graphically shows relationships between the signal Z (before raising to a unit) and Z' (after raising to a unit), obtained when a conventional processing circuit is used.
Figure 2:
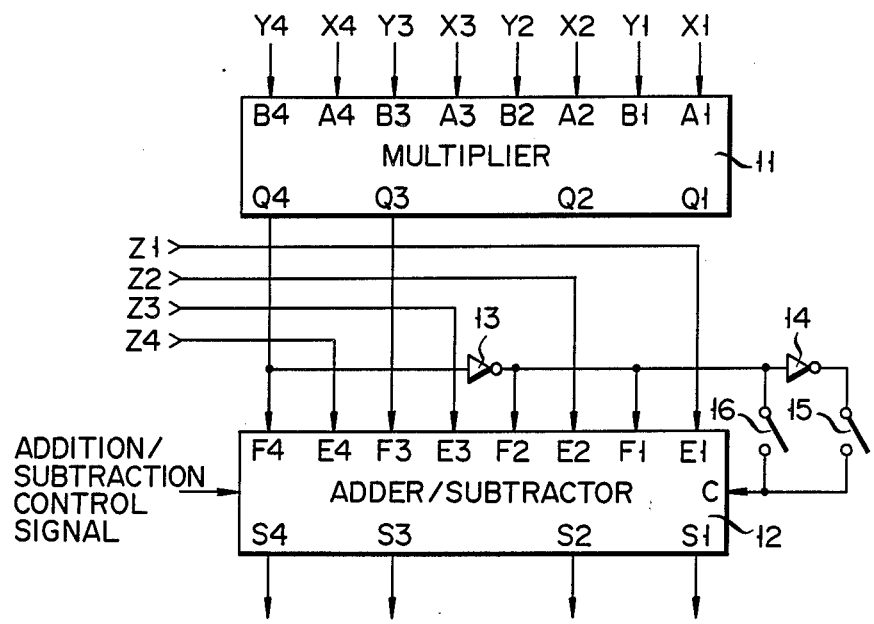
FIG. 2 is a circuit diagram of a digital signal processing circuit according to a first embodiment of the present invention.

The following is a detailed description of the digital signal processing circuit of FIG. 2. In FIG. 2, multiplier 11 has first input terminals A4 to A1 and second input terminals B4 to B1. First 4-bit data in 2's complement format, $X=(X4, X3, X2, X1)$, is input to input terminals A4, A3, A2, A1. Second 4-bit data in 2's complement format, $Y=(Y4, Y3, Y2, Y1)$, is input to input terminals B4, B3, B2, B1. Multiplier 11 multiplies the 4-bit data X and Y. The multiplication result of the data X and Y is represented by $Q=(Q4, Q3, Q2, Q1)$. The two upper bits Q4 and Q3 are input to adder/subtractor 12. The circuit 12 also has first input terminals E4 to E1 and second input terminals F4 to F1. Adder/subtractor 12 receives third 4-bit data at the first input terminals F4 to F1 and fourth 4-bit data at the second input terminals E4—E1. The third and fourth 4-bit data are expressed in 2's complement format. Adder/subtractor 12 executes addition or subtraction of the third and fourth data received at the input terminals E4 to E1 and F4 to F1 according to an addition/subtraction control signal.

The fourth data is data $Z=(Z4, Z3, Z2, Z1)$. Bits Q4 and Q3 are input to the two upper bit terminals F4 and F3 of the input terminals F4 to F1. Bit Q4 is applied to the two lower bits terminals F2 and F1 via inverter 13. In other words, the inverted Q4 bit ($\overline{Q4}$) is input to terminals F2 and F1. Thus, the third data (Q4, Q3, $\overline{Q4}$, $\overline{Q4}$) are input to input terminals F4 to F1. Adder/subtractor 12 is further supplied with carry data input terminal C for receiving carry data used as the least significant input bit. When circuit 12 executes subtraction, the terminal C receives the data Q4 via inverters 13 and 14 and switch 15. When it operates as an adder, terminal C receives the data $\overline{Q4}$ via inverter 13 and switch 16.

Adder/subtractor 12 executes the following logical operation in principle. When it serves as an adder, the logical operation is $$(E4, E3, E2, E1)+(F4, F3, F2, F1)+(0, 0, 0, C)=(S4, S3, S2, S1)$$

When it functions as a subtractor, the operation is $$(E4, E3, E2, E1)+(\overline{F4}, E,ovs/F3/, \overline{F2}, \overline{F1})+(0, 0, 0, C)=(S4, S3, S2, S1)$$

For simplicity, the characters used in these equations denote bits, though they are used in FIG. 2 to denote input or output terminals.

The operation of the processing circuit of FIG. 2 will now be described.

The first 4-bit data $X=F4 \ X3, X2, X1)$ in 2's complement format is applied to input terminals A4 to A1. The second 4-bit data $Y=(Y4, Y3, Y2, Y1)$ is input to terminals B4 to B1. Upon receipt of these data, multiplier 11 performs multiplication of the data X and Y to provide the result $Q=(Q4, Q3, Q2, Q1)$. The two upper bits Q4 and Q3 of the result data $Q=(Q4, Q3, Q2, Q1)$ are input to input terminals F4 and F3 of adder/subtractor 12. The inverted bit $\overline{Q4}$ of bit Q4 is input to terminals F2 and F1 of adder/subtractor 12 by inverter 13. In other words, data Q4, Q3, $\overline{Q4}$, $\overline{Q4}$ are input as the third data to terminals F4 to F1. The 4-bit data $Z=(Z4, Z3, Z2, Z1)$ as the fourth data is input to terminals E4 to E1 of adder/subtractor 12.

In the addition mode set by the addition/subtraction control signal, $Z+Q'$ is performed. In the subtraction mode, $Z-Q'$ is performed.

Here, rearranging equations (1) and (2), we have $$\begin{aligned} Q' &= (0, Q_3, 1, 1) + 1 \\ &= (Q_4, Q_3, Q_4, Q_4) + Q_4 : Q \geq 0 \ (Q_4 = 0) \end{aligned} \quad (3)$$

$$\begin{aligned} Q' &= (1, Q_3, 0, 0) + 0 \\ &= (Q_4, Q_3, Q_4, Q_4) + Q_4 : Q < 0 \ (Q_4 = 1) \end{aligned} \quad (4)$$

If $Qa = (Q_4, Q_3, Q_4, Q_4)$, the data $Q'$ can be expressed as:

$$Q' = Qa + Q4 \quad (5)$$

Substituting equation (5) into $Z + Q'$ and $Z - Q'$, we have $$Z + Q' = Z + Qa + Q4 \text{ (in addition mode)} \quad (6)$$

-continued $$Z - Q' = Z - (Qa + Q4) \quad (7)$$
$$= Z + Qa - Q4 + 1$$
$$= Z + Qa + Q4 \text{ (in subtraction mode)}$$

Adder/subtractor 12 executes the logical operation of equation (6) or (7).

Figure 3:
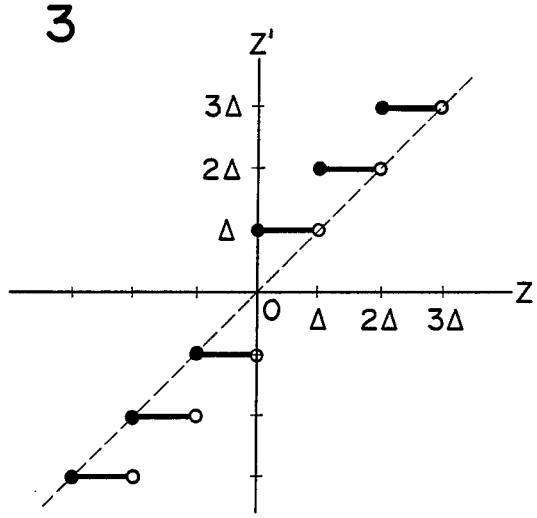
FIG. 3 graphically shows relationships between the signal Z (before raising to a unit) and Z' (after raising to a unit), obtained when the signal processing circuit shown in FIG. 2 is used.

The relationship of the original data Z and the after-raising data Z' can be depicted as shown in FIG. 3. When the original data Z is positive or zero, the N lower bits are made "0"s, and logic 1 is added to the (N+1)th bit. When the original data Z is negative, the N lower bits are made "0"s.

Now consider the mean value, i.e., the DC component, of the signal after it is subjected to the raising to a unit, when a signal with no DC component is input to the circuit of FIG. 2 with the input-output characteristic of FIG. 3. Table 2 shows the relationship between levels of the signal after the raising to a unit and probabilities of these level occurrences. In Table 2, $\Delta = 2^{-(M-N-1)}$ and $Q = 2^{-N}$. The DC component of the signal after the raising to a unit, which is the sum of the products of the respective signal levels and the corresponding probabilities in Table 2, is zero.

TABLE 2

| Signal level after raising to a unit | Occurrence probablity |
|---|---|
| $2^{M-N-1} \cdot \Delta$ | $2^{N-M}$ |
| $2 \cdot \Delta$ | $s^{N-M}$ |
| $\Delta$ | $2^{N-M}$ |
| 0 | 0 |
| $-\Delta$ | $2^{N-M}$ |
| $-2 \cdot \Delta$ | $2^{N-M}$ |
| $-2^{M-N-1} \cdot \Delta$ | $2^{N-M}$ |

DC component: 0

The principle of a digital signal processing circuit according to a second embodiment of the present invention will now be described. 5-bit data X (=Sx, X4, X3, X2, X1) is multiplied by 5-bit data Y=(Sy, Y4, Y3, Y2, Y1). The 5-bit data X and Y are expressed in 2's complement format. Sx and Sy are sign bits.

In the expression of the 5-bit data X, bit Sx is the highest or most significant bit (MSB) and X4 is the second most significant bit. The greater the suffix for each of the bits X4–X1 the higher the significance of the bits. X1 is the lowest or least significance of the bit (LSB).

In the expression of the 5-bit data Y, bit Sy is the highest or most significant bit (MSB) and Y4 is the second most significant bit. The greater the suffix for each of the bits Y4–Y1, the higher the significance of the bit. Y1 is the lowest or least significant bit (LSB).

The higher or upper 5-bit data Q=(S, Q4, Q3, Q2, Q1) of the actual result of multiplication of data X and Y is used as the virtual multiplication result. S is a sign bit. The two lower bits Q2 and Q1 of the multiplication result Q=(S, Q4, Q3, Q2, Q1) are raised to a unit. The data Q' after the raising to a unit is expressed as follows, according to whether the data Q is negative or positive.

$$Q' = (0, Q_4, Q_3, 0, 0) \text{ when } Q \geq 0 \ (S = 0) \text{ and} \quad (8)$$
$$Q1 \oplus Q2 = 0$$

-continued $$Q' = (0, Q_4, Q_3 + 1, 0, 0,) \text{ when } Q \geq 0 \ (S = 0) \text{ and} \quad (9)$$
$$Q1 \oplus Q2 = 1$$

$$Q' = (1, Q_4, Q_3, 0, 0) \text{ when } Q < 0 \ (S = 1) \quad (10)$$

$\oplus$ indicates logical product.

The after-raising data Q' and the original data Z are subjected to addition or subtraction or provide Z+Q' or Z−Q'. The multiplication of the 5-bit data X and Y, the addition Z+Q' and the subtraction Z−Q' may be performed by the circuit as shown in FIG. 4.

The following is a detailed description of the digital signal processing circuit of FIG. 4. In FIG. 4, multiplier 21 has first input terminals A5 to A1 and second input terminals B5 to B1. First 5-bit data in 2's complement format, X=(Sx, X4, X3, X2, X1), is input to input terminals A5, A4, A3, A2, A1. Second 5-bit data in 2's complement format, Y=(Sy, Y4, Y3, Y2, Y1), is input to input terminals B5, B4, B3, B2, B1. Multiplier 21 multiplies the 5-bit data X and Y. The multiplication result of data X and Y is represented by Q=(S, Q4, Q3, Q2, Q1). The three upper bits S, Q4 and Q3 are input to adder/subtractor 22. The circuit 22 has first input terminals E5 to E1 and second input terminals F5 to F1. Adder/subtractor 22 receives at the first input terminals F5 to F1 third 5-bit data and at the second input terminals E5 to E1 fourth 5-bit data. The third and fourth 5-bit data are expressed in 2's complement format. Adder/subtractor 22 executes addition or subtraction of the third and fourth data received at the input terminals E5 to E1 and F5 to F1 according to an addition/subtraction control signal. The fourth data is data Z=(Sz, Z4, Z3, Z2, Z1). Bits S, Q4 and Q3 are input to the three upper bit terminals F5, F4 and F3 of the input terminals F5 to F1. The two lower bit terminals F2 and F1 are supplied with data corresponding to $\overline{S} \otimes (Q1 \oplus Q2)$, which is formed by the combination of OR circuit 23, inverter 24, and AND circuit 25. In the above logical expression, $\otimes$ indicates logical product. Data $\overline{S} \otimes (Q1 \oplus Q2)$ is formed by inputting the logical sum of the lower bits Q2 and Q1 and the bit $\overline{S}$ into AND circuit 25. The logical sum is formed by inputting the two lower bits Q2 and Q1 of the multiplication result Q into OR circuit 23. The data $\overline{S}$ is formed by inverting the highest bit S of the multification result Q by means of inverter 24. Thus, the data comprised of S, Q4, Q3, $\overline{S} \otimes Q1 \oplus Q2$ and $\overline{S} \otimes (Q1 \oplus Q2)$, as the third data, is input to input terminals F5 to F1. Adder/subtractor 22 is further supplied with carry data input terminal C for receiving carry data used as the least significant input bit. In the addition mode of adder/subtractor 22, data $S \otimes (Q1 \oplus Q2)$ is applied to input terminal C via switch circuit 26. In the subtraction mode, data $S \otimes (Q1 \oplus Q2)$ is inverted to $\overline{S \otimes (Q1 \ Q2)}$ by inverter 27, and the data $\overline{S \otimes (Q1 \oplus Q2)}$ is supplied to input terminal C via switch circuit 28.

Adder/subtractor 22 executes the following logical operation in principle. When it functions as an adder, the logical operation is (E5, E4, E3, E2, E1)+(F5, F4, F3, F2, F1)+(0, 0, 0, 0, C)=(S5, S4, S3, S2, S1)

When it functions as a subtractor, the operation is (E5, E4, E3, E2, E1)+(F5, F4, F3, F2, F1)+(0, 0, 0, 0 C)=(S5, S4, S3, S2, S1).

For simplicity, the characters used in these equations denote bits, though they are used in FIG. 4 to denote input or output terminals.

The operation of the processing circuit of FIG. 4 will now be described.

The first 5-bit data X=(Sx, X4, X3, X2, X1) in 2's complement format is applied to input terminals A5 to A1. The second 5-bit data Y (Sy, Y4, Y3Y2, Y1) is input to terminals B5 to B1. Upon receipt of these data, multiplier 21 multiplies the data X and Y to provide the result Q=(S, Q4, Q3, Q2, Q1). The three upper bits S, Q4 and Q3 of the result data Q=(S, Q4, Q3, Q2, Q1) are input to terminals F5, F4 and F3 of adder/subtractor 22. Input terminals F2 and F1 are supplied with data $\bar{S}\otimes(Q1\oplus Q2)$ which is formed by OR circuit 23, inverter 24 and AND circuit 25. In other words, input terminals F5 to F1 are supplied with S, Q4, Q3, $S\otimes(Q1\oplus Q2)$ and $S\otimes(Q1\oplus Q2)$. The 5-bit data Z=(Sz, Z4, Z3, Z2, Z1) as the fourth data is input to terminals E5 to E1 of adder/subtractor 22.

In the addition mode set by the addition/subtraction control signal, $Z+Q'$ is performed. In the subtraction mode, $Z-Q'$ is performed. Relations (8) to (9) can be generally expressed as:

$$Q' = [S, Q_4, Q_3, S\otimes(Q_2\oplus Q_1), S\otimes(Q_2\oplus Q_1)] + \quad (11)$$

$$S\otimes(Q_2\oplus Q_1) = Qa + S\otimes(Q_2\oplus Q_1)$$

where Qa is defined as $[S, Q_4, Q_3, \bar{S}\otimes(Q_2\oplus Q_1), \bar{S}\otimes(Q_2\oplus Q_1)]$ Substituting relation (11) into $Z+Q'$ and $Z-Q'$, we have $$Z + Q' = Z + Qa + S\otimes(Q_2\oplus Q_1) \text{ (in addition)} \quad (12)$$

$$Z - Q' = Z - [Qa + S\otimes(Q_2\oplus Q_1)] \quad (13)$$
$$= Z - Qa - S\otimes(Q_2\oplus Q_1) \text{ (in subtraction)}$$

Adder/subtractor 22 executes the operation of equation (12) or (13). The definition of the 2's complement gives $$-Qa = \overline{Qa} + 1.$$

Hence equation (13) can be rewritten as:

$$Z - Q' = Z + \overline{Qa} + 1 - S\otimes(Q_2\oplus Q_1) \quad (14)$$
$$= Z + \overline{Qa} + \overline{S\otimes(Q_2\oplus Q_1)} \text{ (in subtraction)}$$

where $$1 - S\otimes(Q2\oplus Q1) \begin{cases} = 1: \text{when } S = 0 \text{ and } Q2\oplus Q1 = 0 \\ = 0: \text{when } S = 0 \text{ and } Q2\oplus Q1 = 1 \\ = 1: \text{when } S = 1 \end{cases}$$

Hence, $$1 - S\otimes(Q2\oplus Q1) = S\oplus(Q2\oplus Q1) \quad (15)$$
$$= \overline{S\otimes(Q2\oplus Q1)}$$

The relationship of the original data Z and the after raising data Z' can be depicted as shown in FIG. 5. If Z=0, Z'=0. If Z is positive and the N lower bits are all binary "0"s, then Z=Z'. If z is positive and the N lower bits contain even one bit of binary "1", then the N lower bits are all made binary "0"s and the value resulting from addition of 1 to the (N+1)th bit is made Z'. If Z is negative, the N lower bits are all made binary "0"s.

Now consider the mean value, i.e., the DC component, of the signal after it is subjected to the raising to a unit, when a signal with no DC component is input to the circuit of FIG. 4 with the input-output characteristic of FIG. 5. Table 3 shows the relationship between levels of the signal after the raising to a unit and probabilities of these level occurrences. In Table 3, $\Delta = 2^{-(M-N-1)}$ and $Q = 2^{-N}$. The DC component of the signal after the raising to a unit, which is the sum of the products of the respective signal levels and the corresponding probabilities in the Table 3, is expressed by $-\Delta/2^{N+1}$. This value is equal to that of Table 1. However, if the dynamic range of the input signal is limited from $-(2^{M-N-1}-1)\cdot\Delta$ to $(2^{M-N-1}-1)\cdot\Delta$, the DC component of the after-raising signal is zero.

TABLE 3

| Signal level after raising to a unit | Occurrence probablity |
|---|---|
| $2^{M-N-1} \cdot \Delta$ | $(2^N - 1) \cdot 2^{-M}$ |
| $2 \cdot \Delta$ | $2^{N-M}$ |
| $\Delta$ | $2^{N-M}$ |
| 0 | $2^{-M}$ |
| $-\Delta$ | $2^{N-M}$ |
| $-2 \cdot \Delta$ | $2^{N-M}$ |
| $-2^{M-N-1} \cdot \Delta$ | $s^{N-M}$ |

DC component: $-\Delta/2^{N+1}$

As seen from the foregoing, the present invention provides a digital signal processing circuit with a decreased negative DC component and improved accuracy of logical operation.

What is claimed is:

1. A circuit for multiplying first and second binary data in 2's complement format to obtain a multiplication result, generating a third data in 2's complement format from that result, and adding or subtracting the third data to or from a fourth data in 2's complement format, comprising:

a multiplier for multiplying said first and second binary data in 2's complement format and deleting a predetermined number of least significant bits of the actual multiplication result to obtain a virtual multiplication result;

an adder/subtractor for performing addition/subtraction of said third binary data and said fourth binary data in 2's complement format in response to a control signal, the most significant bits of said third binary data being said virtual multiplication result and a plurality of lower bits of said third binary data being an inverted most significant bit of said virtual multiplication result; and means for supplying to said adder/subtractor said inverted most significant bit of said virtual multiplication result as the least significant bit when said adder/subtractor operates in an adder mode, and for supplying to said adder/subtractor said most significant bit of said virtual multiplication result as the least significant bit when said adder/subtractor operates in a subtractor mode.

2. A digital signal processing circuit according to claim 1, wherein said least significant bit supplied to said adder/subtractor is supplied as a carry input.

3. A circuit for multiplying first and second binary data in 2's complement format to obtain a multiplication result, processing the multiplication result to provide a third data in 2's complement format, and adding or subtracting the third data to or from a fourth data in 2's complement format, comprising:
- a multiplier for multiplying said first and second binary data in 2's complement format and providing a multiplication result;
- an adder/subtractor for performing addition/subtraction of said third binary data and said fourth binary data in 2's complement format in response to a control signal, a plurality of most significant bits of said third binary data being a predetermined number of most significant bits of said multiplication result and a plurality of lower significant bits of said third binary data being a logical product of a logical sum of a plurality of least significant bits of said multiplication result with an inverted most significant bit of said multiplication result; and
- means for supplying to said adder/subtractor said logical product as the least significant bit when said adder/subtractor operates in an adder mode, and for supplying to said adder/subtractor an inverted logical product as the least significant bit when said adder/subtractor operates in a subtractor mode.

4. A digital signal processing circuit according to claim 3, wherein said least significant bit is supplied to said adder/subtractor as a carry input.

* * * * *